United States Patent
Kramer

(10) Patent No.: US 7,110,532 B2
(45) Date of Patent: Sep. 19, 2006

(54) METHOD OF LINE MATCHING IN TELECOMMUNICATION NETWORKS

(75) Inventor: Richard Kramer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/612,893

(22) Filed: Jul. 7, 2003

(65) Prior Publication Data

US 2004/0037418 A1 Feb. 26, 2004

(30) Foreign Application Priority Data

Jul. 4, 2002 (DE) .............................. 102 30 101

(51) Int. Cl.
*H04M 7/04* (2006.01)
(52) U.S. Cl. .................. 379/406.06; 379/403
(58) Field of Classification Search ................ 379/406, 379/402–405, 394; 370/286–292; 455/570
See application file for complete search history.

(56) References Cited

U.S. PATENT DOCUMENTS 5,732,134 A * 3/1998 Sih ....................... 379/406.13
6,181,793 B1 1/2001 Laberteaux et al.
2003/0219113 A1 * 11/2003 Bershad et al. ........ 379/406.01

FOREIGN PATENT DOCUMENTS

EP 0 301 627 A1 2/1989
EP 1 093 284 A2 4/2001

* cited by examiner

*Primary Examiner*—Sinh Tran
*Assistant Examiner*—Walter F Briney, III
(74) *Attorney, Agent, or Firm*—Staas & Halsey LLP

(57) ABSTRACT

One aspect of the invention relates to a method for line matching of analog communication lines in telecommunications networks, whereby signal processor(s) and/or programmable digital filters are used. Coefficients of the line transmission function are calculated by an echo compensator to be compared with pre-specified filter coefficients in a filter device assigned to the line, in which case, an incorrect line matching is identified and a new set of filter coefficients is generated, which is fed into the filter device. In this case, the first values to be accepted and processed for the coefficients of the line transmission function calculated by the echo compensator and used for comparison, are those that are determined by an echo compensator for a first line gateway in a line path, which is associated with the reflection with the shortest delay time. In networks with high dispersion of the line parameters, the invention re-establishes the task distribution between line matching and echo compensator.

8 Claims, 1 Drawing Sheet

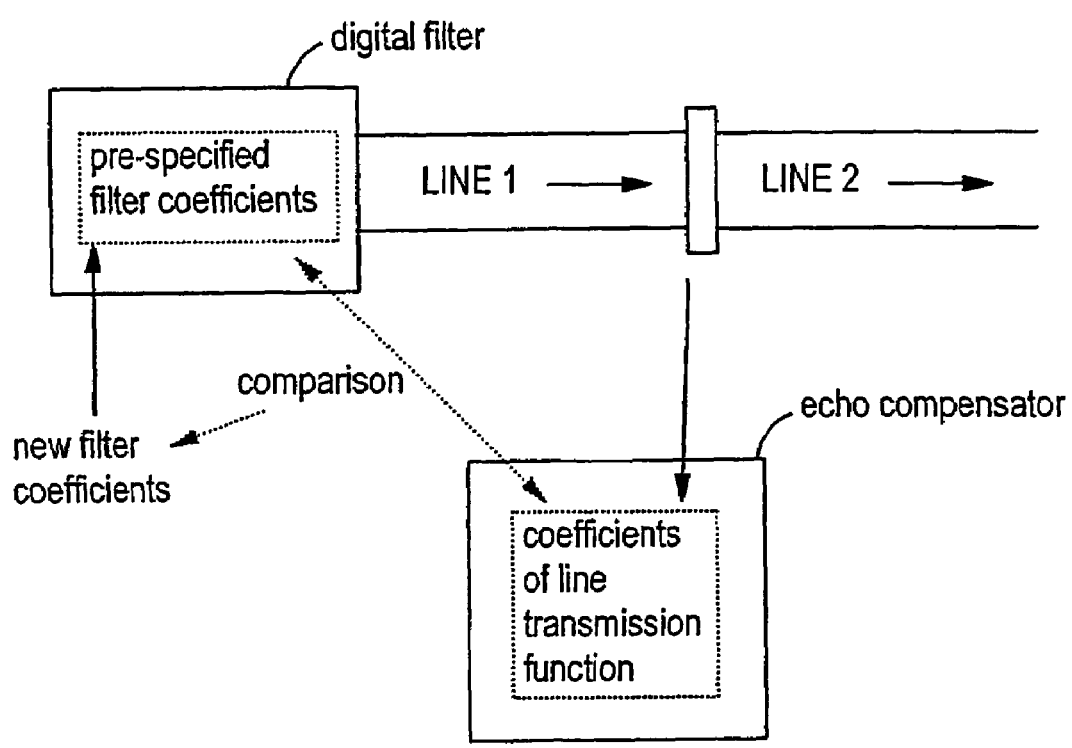

METHOD OF LINE MATCHING IN TELECOMMUNICATION NETWORKS

CROSS REFERENCE TO RELATED APPLICATIONS

This application is based on and hereby claims priority to German Application No. 10230101.8 filed on Jul. 4, 2002, the contents of which are hereby incorporated by reference.

BACKGROUND OF THE INVENTION

An aspect of the invention relates to a method of matching analog communications lines in telecommunications networks, whereby signal processors and/or programmable digital filters are used. Further, the invention comprises a device for executing the procedure as well as a program product.

To implement digital four-wire connections on analog two-wire access lines, what are known as codecs or coder/decoder filters with converters to convert analog to digital and vice versa are used on subscriber and exchange modules together with the Subscriber Line Interface Circuits. The lines are matched to country-specific line parameters, for example, by programmable digital filters for which the parameter set is adapted to the relevant line parameter. The parameter set is based on data which is specified by a provider, a network operator or a telecommunications authority for a standard network case. Meaning, individual lines, depending on the quality and features of the network, can differ to a greater or lesser extent since connected lines can exhibit different impedance from each other based on qualitative and quantitative differences in line interfaces, which leads to incorrect line matching. In particular, in interfaces between internet protocol-based networks, known as "Voice-Over-IP" networks and networks known as PTSN ("Public Switched Telephone Network"). For example, known telephone networks with analog exchange lines the incorrect line matching results in reflections at the 4-wire to 2-wire conversion, which as a result of the high delay of the IP networks in comparison to PSTN is only audible in PSTN-IP network couplings as an acoustic echo. The additional fault locations defined by the incorrect matching result in greater computing effort and increased calculation effort for the echo compensators, used between the PSTN and IP network in order to reduce the echo for the input-side line. In particular, at the beginning of a communications link, the effect caused by the additional fault location leads to an audible echo. Because of the increased computation time and the correspondingly slow convergence behavior of the echo compensators used, the execution sequence for this type of communications link remains adversely affected in this state of-the-art.

By contrast, One object of the invention is to provide a method mentioned at the start of this document with which incorrect line matching and the resulting reflections, in particular, for transmission gateways from Internet Protocol-based networks or mobile radio networks to analog telephone networks are largely minimized in a cost-effective way. And, the line-specific (constant for each access line) (residual) matching can again be fed back from the echo compensator, which should only compensate for connection-specific echoes as quickly as possible, to the line circuit.

SUMMARY OF THE INVENTION

An object of the present invention is achieved by comparing the coefficient of the line transmission function, calculated by an echo compensator, with the preset filter coefficients in a digital filtering device assigned to the line. Then, an incorrect line matching is determined and a new set of filter coefficients is generated from it, which is then fed into the digital filter device.

According to the invention that the data which is determined by an echo compensator for the relevant line, which preferably can be located within a gateway assigned to the relevant line, represents a measure for the reflection in the line and thereby a measure for the incorrect line matching. Thus, by comparison operations with the fixed coefficients stored in the digital filter device, a set of parameters that approximates the actual line characteristics of the connected line is generated. This new set of parameters generated from the comparison operation is stored instantaneously in the filter device assigned to the line. This improves the individual reflection behavior in the line switched at the time for all voice connections, whereby savings can be made, for example, on in-situ or local measurements and settings on the individual lines with the corresponding effort in personnel resources.

BRIEF DESCRIPTION OF THE DRAWING

The single FIGURE is a schematic view of a line matching device according to an embodiment of the present invention.

DETAILED DESCRIPTION OF THE INVENTION

A preferred embodiment of the method in accordance with the invention comprises accepting and processing those first values of the coefficients of the line transmission function calculated by the echo compensator, and making available for comparison which are determined by the echo compensator for a first line interface located in the line path. After convergence, the filter coefficient register of an echo compensator shows the filter coefficients for the pulse response of the link, in which case, the pulse response extends from first gateway point over further subordinate analog gateways with the corresponding delay time differences for the reflections or echoes generated at the gateways; since only the first value associated with the first gateway is recorded and accepted, which is already a measure of the reflection at the analog gateway and thereby of the incorrect line matching there is already an individual line matching which lies in the order of magnitude of a millisecond. The actual computation process provided for comparison and generation of new filter coefficients is undertaken in this case using folding and/or Fourier transformation operations. Alternatively, the calculation procedure provided for the comparison can be undertaken using compute-time optimized approximation methods.

In regards to the technology of the equipment required, the object specified above will be achieved for equipment provided to execute the method in accordance with the invention with digital signal processing means so that a least one processor device is provided which records the coefficients calculated by the echo compensator, makes the comparison, generates new parameters on it and feeds them into the digital filter device.

The procedural steps in accordance with the invention can preferably be performed by a processor device already provided and installed in a gateway or in a corresponding communications device, e.g. a PBX ("Private Branch Exchange"), for known control purposes. In this case there is no need to install additional hardware. The program product can for example be designed as fast machine code and is included in the device for executing the method in accordance with the invention so that the method can be executed automatically.

A form of embodiment of the invention is to be explained below in more detail using an exemplary embodiment.

In particular, in countries in which the public telephone network is deregulated and different network operators provide access, the impedances of the analog access lines exhibit strong variations. The incorrect line matching is therefore barely perceptible with analog or mixed analog/digital telephone networks because of the relatively short delay times. Only with long delay times, which occur particularly through linking internet-protocol-based networks or mobile radio networks to known telephone networks with analog access lines and of the order of magnitude of 100 to 300 milliseconds, audible echoes which disturb telephone calls over analog lines (e.g. exchange access lines) with two-wire/four-wire conversion arise. Accordingly, echo compensators are provided in the gateways to remove the echoes generated in these networks. In addition, the digital signal processors or filter devices with fixed filter coefficients used for line matching are programmed for the transmission function which originates by default from the specifications of the relevant provider, network operator or regulatory authority, as a standardized line building out with a specific impedance, for example, 600 ohms merely represents an average of all access lines in the relevant network. Since the individual lines with their line impedances are widely distributed around this average, the resulting incorrect line matching already leads to significant reflections with echoes on the four-wire/two-wire hybrid gateway of the analog access module in the line. Thus, for an individual line matching, it would thus be necessary: to measure all access lines in a corresponding network individually for the relevant assigned impedance, to determine from this for each access line the corresponding filter coefficients, and feed them into the relevant signal processor or the relevant digital filter device, which would require an enormous effort in personnel resources.

This is where the method in accordance with the invention comes in, in that the coefficients of the line transmission function calculated by an echo compensator are compared with the preset coefficients in a filter device assigned to the relevant access line, in which case, incorrect line matching is determined and the new set of filter coefficients is generated and then fed instantaneously into the filter device. The coefficients calculated by the echo compensator are restricted in this case to a first gateway in the access line, i.e. to that reflection with the shortest delay time. Executing a comparison procedure on the basis of these coefficients as a measure for the incorrect line matching in which new filter parameters are generated for the digital filter device, and fed instantaneously into the latter means that an improved line matching and one which is approximated to the actual impedance is produced right at the start of a voice connection over the exchange line. This gives individual line matching without long-winded and personnel-intensive measurements and settings on site at the corresponding exchange line or digital filter device. If the line circuit or telephone exchange and an IP gateway form a communications unit, exchange of data between the components is made easier. In the exemplary embodiment, the interaction of the echo compensator and the digital filter device in the gateway is executed by a microprocessor already provided and installed for known control tasks. The microprocessor also executes program code with the procedure steps in accordance with the invention implemented in it, so that the method in accordance with the invention can be executed without additional hardware. In networks with high dispersion of line parameters, the invention re-establishes the distribution of tasks between line matching and echo compensator.

The invention has been described in detail with particular reference to preferred embodiments thereof and examples, but it will be understood that variations and modifications can be effected within the spirit and scope of the invention.

The invention claimed is:

1. A method of line matching for analog communications lines in telecommunications networks via at least one signal processor and/or programmable digital filter, comprising:
   calculating coefficients of a line transmission function via an echo compensator;
   performing a comparison of the calculated coefficients of the line transmission function and pre-specified filter coefficients in a digital filter device assigned to an analog communication line;
   identifying incorrect line matching based on the comparison;
   generating a new set of filter coefficients when incorrect line matching is identified; and
   feeding the new set of filter coefficients into the digital filter device.

2. The method according to claim 1, wherein the coefficients of the line transmission function calculated by the echo compensator and provided for comparison are those that were identified by the echo compensator for a first line gateway in the line path.

3. The method according to claim 1, wherein the comparison is made using a folding and/or Fourier transformation operations.

4. The method according to claim 2, wherein the comparison is made using a folding and/or Fourier transformation operations.

5. The method according to claim 1, wherein the comparison is executed between compute-time optimized approximation methods.

6. A device for line matching for analog communications lines in telecommunications networks, comprising:
   an echo compensator to calculate coefficients of a line transmission function;
   at least one signal processor device:
      to record the coefficients of the line transmission function calculated by the echo compensator;
      to compare the calculated coefficients of the line transmission function with pre-specified filter coefficients in a digital filter device assigned to an analog communication line;
      to generate new parameters when incorrect line matching is identified; and
      to feed the new parameters into the digital filter device.

7. The device according to claim 6, wherein the comparison is made using a folding and/or Fourier transformation operations.

8. A machine readable medium storing a program to control a computer to perform a method of line matching for analog communications lines in telecommunications networks, the method comprising:

calculating coefficients of a line transmission function via an echo compensator;

performing a comparison of the calculated coefficients of the line transmission function and pre-specified filter coefficients in a digital filter device assigned to an analog communication line;

identifying incorrect line matching based on the comparison;

generating a new set of filter coefficients when incorrect line matching is identified; and feeding the new set of filter coefficients into the digital filter device.

* * * * *